Patented Aug. 22, 1950

2,519,487

UNITED STATES PATENT OFFICE 2,519,487

MULTIVITAMIN PREPARATION

Thomas Joseph Macek, Irvington, N. J., assignor to Merck & Co., Inc., Rahway, N. J., a corporation of New Jersey No Drawing. Application July 2, 1947,
Serial No. 758,726

1 Claim. (Cl. 167—81)

This invention relates generally to vitamin preparations, and more particularly, to stabilized multi-vitamin preparations including capsules, tablets, pills and the like.

Pharmaceutical multi-vitamin preparations such as, for example, soft gelatin capsules usually contain varying proportions of vitamins A and D, thiamin hydrochloride, riboflavin, pyridoxine hydrochloride, niacin or niacinamide, pantothenic acid or its salt and ascorbic acid. These vitamins are usually mixed with a bland oil, adjusted to a suitable viscosity, and enclosed in soft gelatin capsules.

It has been found that these and similar multi-vitamin preparations decompose during storage at room temperature due to the instability of the pantothenic acid component which results in a loss of pantothenic acid content. At room temperature, losses range from about 10% after 2 months' storage, to about 40% after 6 months. In several instances these losses have been observed to reach 64% after 6 months of storage at room temperature. Obviously a loss of pantothenic acid content of about 40 to 64% seriously impairs the therapeutic value of a multi-vitamin preparation containing carefully balanced amounts of the vitamins intended to provide the necessary dietary or therapeutic requirements. Furthermore, since the pantothenic acid content of multi-vitamin preparations varies considerably, depending on the length of time of storage, there is practically no relationship between the actual pantothenic acid content and the amount indicated on the label, so that the patient does not receive the full amounts of essential vitamins required for his well-being. Obviously a pharmaceutical preparation which decomposes rapidly is of little therapeutic value.

I have now found that relatively stable multivitamin preparations can be made, whereby the loss of pantothenic acid is eliminated or materially reduced. The vitamin products prepared in accordance with my invention herein disclosed, are characterized by an enhanced stability, i. e. the loss of pantothenic acid component is insignificant and within a reasonable tolerance, as for example, USP tolerance.

I have now found that relatively stable multivitamin products containing a pantothenic acid component, such as calcium pantothenate, can be prepared by the addition of edible, non toxic, stabilizing substances such as salts of magnesium, natural substances containing a magnesium salt and the like. Suitable stabilizers, are, for example, dibasic magnesium phosphate, talc USP, skimmed milk powder, and the like.

The pantothenic acid content of the stabilized multi-vitamin products is maintained within a reasonable tolerance (USP tolerance) even after a prolonged storage so that the consumer is assured of an exact vitamin content. Thus the therapeutic usefulness of these stabilized preparations can be preserved for long periods of time.

While the stabilizing substances such as magnesium salts and the like are of particular importance in the preparation of soft gelatin capsules, other stable pharmaceuticals such as tablets, pills and the like can be prepared by mixing the essential vitamins, including calcium pantothenate with a stabilizing substance.

The following examples illustrate methods of carrying out the present invention, but it is to be understood that these examples are given by way of illustration and not of limitation.

*Stability of pantothenic acid in six samples of multi-vitamin capsules containing calcium pantothenate*

| | Mgm./Capsule and Per Cent Loss from Initial Assay | | | | | |
|---|---|---|---|---|---|---|
| | Sample A | Sample B | Sample C | Sample D | Sample E | Sample F |
| Initial Assay | 0.75 | 0.47 | 0.97 | 1.35 | 1.03 | 1.00 |
| After 2 mo. at Rm. Temp | | | | | 0.92 (−11%) | 0.92 (−8%) |
| After 3 mo. at Rm. Temp | 0.61 (−19%) | 0.32 (−30%) | 0.52 (−46%) | 0.65 (−52%) | | |
| After 4 mo. at Rm. Temp | | | | | 0.83 (−20%) | 0.90 (−10%) |
| After 6 mo. at Rm. Temp | 0.59 (−21%) | 0.29 (−38%) | 0.52 (−46%) | 0.49 (−64%) | 0.65 (−37%) | 0.68 (−32%) |

Example 1

| | |
|---|---|
| Thiamin hydrochloride____mg./capsule__ | 1.5 |
| Pantothenic acid (as calcium salt) _____do____ | 1.0 |
| Riboflavin _____do____ | 2.0 |
| Pyridoxine hydrochloride_____do____ | 0.1 |
| Niacinamide _____do____ | 20.0 |
| Ascorbic acid _____do____ | 37.5 |
| Skimmed milk powder _____do____ | 112.75 |
| Vitamin A_____USP units/cap.__ | 5000 |
| Vitamin D _____do____ | 500 |
| Excipients and diluents, a sufficient quantity. | |

A pulverized mixture containing the first seven ingredients in the above proportions was mixed with a bland oil diluent, i. e. corn oil, containing vitamins A and D in the form of fish-liver oil concentrate, and excipients such as hydrogenated cottonseed oil and beeswax to adjust the viscosity. The mixture was milled to smoothness then filled into spherical soft gelatin capsules on a machine.

Example 2

| | |
|---|---|
| Thiamin mononitrate_____mg./capsule__ | 1.5 |
| Pantothenic acid (as calcium salt) _____do____ | 1.0 |
| Riboflavin _____do____ | 2.0 |
| Pyridoxine hydrochloride_____do____ | 0.1 |
| Niacinamide _____do____ | 20.0 |
| Ascorbic acid _____do____ | 37.5 |
| Dibasic magnesium phosphate____do____ | 112.75 |
| Vitamin A_____USP units/cap.__ | 5000 |
| Vitamin D_____do____ | 500 |
| Excipients and diluents, a sufficient quantity. | |

These capsules were prepared in accordance with Example 1.

Example 3

| | |
|---|---|
| Thiamin hydrochloride____mg./capsule__ | 1.5 |
| Pantothenic acid (as calcium salt) _____do____ | 1.0 |
| Riboflavin _____do____ | 2.0 |
| Pyridoxine hydrochloride_____do____ | 0.1 |
| Niacinamide _____do____ | 20.0 |
| Ascorbic acid _____do____ | 37.5 |
| Dibasic magnesium phosphate____do____ | 112.75 |
| Vitamin A_____USP units/cap.__ | 5000 |
| Vitamin D_____do____ | 500 |
| Excipients and diluents, a sufficient quantity. | |

These capsules were prepared in accordance with Example 1.

Example 4

| | |
|---|---|
| Thiamin hydrochloride_____mg./cap.__ | 1.5 |
| Pantothenic acid (as calcium salt) _____do____ | 1.0 |
| Riboflavin _____do____ | 2.0 |
| Pyridoxine hydrochloride_____do____ | 0.1 |
| Niacinamide _____do____ | 20.0 |
| Ascorbic acid _____do____ | 37.5 |
| Talc USP_____do____ | 112.75 |
| Vitamin A_____USP units/cap.__ | 5000 |
| Vitamin D _____do____ | 500 |
| Excipients and diluents, a sufficient quantity. | |

These capsules were prepared in accordance with Example 1.

Example 5

| | Mg./cap. |
|---|---|
| Thiamin hydrochloride_____ | 1.000 |
| Pantothenic acid (as calcium salt)_____ | 0.500 |
| Riboflavin _____ | 0.500 |
| Niacinamide _____ | 5.000 |
| Pyridoxine hydrochloride_____ | 0.125 |
| Skimmed milk powder_____ | 316.875 |
| | 324 |

A mixture of the ingredients in the above proportions was filled into hard gelatin capsules. Such capsules have been kept in screw-capped bottles at room temperature for 6 months with no loss of the pantothenic acid component.

Example 6

| | Mg./caps. |
|---|---|
| Thiamin mononitrate_____ | 1.000 |
| Pantothenic acid (as calcium salt)_____ | 0.500 |
| Riboflavin _____ | 0.500 |
| Niacinamide _____ | 5.000 |
| Pyridoxine hydrochloride_____ | 0.125 |
| Skimmed milk powder_____ | 316.875 |
| | 324 |

These capsules were prepared in accordance with Example 3 and such capsules have been kept in screw-capped bottles at room temperature for 6 months with no loss of the pantothenic acid component.

*Stability of pantothenic acid in three multivitamin capsules containing calcium pantothenate and added stabilizers*

| | Mg./Capsule and Per Cent Loss from Initial Assay | | |
|---|---|---|---|
| | Sample A, Skimmed Milk Powd. | Sample B, Dibasic Magnesium Phosphate | Sample C, Powdered Talc USP |
| Initial Assay_____ | 0.96 | 1.02 | 0.90 |
| After 2 mo. at Rm. Temp_____ | 1.00 | 0.98(−4%) | 0.85(−6%) |
| After 3 mo. at Rm. Temp_____ | 0.91(−5%) | 1.01(−1%) | 0.85(−6%) |
| After 4 mo. at Rm. Temp_____ | | 0.98(−4%) | |
| After 6 mo. at Rm. Temp_____ | 0.95(−1%) | 1.02( 0 ) | 0.80(−12%) |

Various changes and modifications might be made in my invention, as described, without departing from the scope thereof. To the extent that such changes and modification procedures are within the scope of the appended claim, they are to be considered as part of my invention.

I claim:

A multivitamin preparation comprising essential vitamins including powdered calcium pantothenate and dibasic magnesium phosphate as a stabilizing agent for said calcium pantothenate, said dibasic magnesium phosphate being present in an amount sufficient to inhibit decomposition of said calcium pantothenate during storage.

THOMAS JOSEPH MACEK.

REFERENCES CITED

The following references are of record in the file of this patent:

UNITED STATES PATENTS

| Number | Name | Date |
|---|---|---|
| 2,195,595 | Nitardy _____ | Apr. 2, 1940 |
| 2,359,413 | Freedman _____ | Oct. 31, 1944 |
| 2,406,741 | Compton et al. _____ | Sept. 3, 1946 |
| 2,410,417 | Anderson _____ | Nov. 5, 1946 |
| 2,433,688 | Fox _____ | Dec. 30, 1947 |